(12) United States Patent
Warren (10) Patent No.: US 7,810,830 B2
(45) Date of Patent: Oct. 12, 2010

(54) BOAT TRAILER WITH STORAGE COMPARTMENTS

(76) Inventor: William Travis Warren, 704 N. Chaparral, Burnet, TX (US) 78611

(*) Notice: Subject to any disclaimer, the term of this patent is extended or adjusted under 35 U.S.C. 154(b) by 428 days.

(21) Appl. No.: 11/787,957

(22) Filed: Apr. 18, 2007

(65) Prior Publication Data
US 2007/0187924 A1 Aug. 16, 2007

Related U.S. Application Data

(63) Continuation-in-part of application No. 29/241,731, filed on Oct. 31, 2005, now Pat. No. Des. 542,716.

(51) Int. Cl.
B60P 3/10 (2006.01)
(52) U.S. Cl. ..................... 280/414.1; 114/344
(58) Field of Classification Search ... 280/414.1–414.3, 280/47.331; 114/344
See application file for complete search history.

(56) References Cited

U.S. PATENT DOCUMENTS

| | | | | |
|---|---|---|---|---|
| 1,994,451 A * | 3/1935 | Christenson | ............... | 180/68.5 |
| 2,788,146 A * | 4/1957 | Gronlund | .................... | 414/482 |
| 3,065,721 A * | 11/1962 | Roudabush | ................. | 114/263 |
| 3,110,507 A * | 11/1963 | Riner | ......................... | 280/422 |
| 3,126,855 A * | 3/1964 | Freeburg | ...................... | 114/45 |
| 3,131,902 A * | 5/1964 | Zak, Jr. | .................... | 248/354.3 |
| 3,224,019 A * | 12/1965 | Gudmundson | .............. | 114/344 |
| 3,339,217 A * | 9/1967 | Gudmundson | .............. | 114/344 |
| 3,365,733 A * | 1/1968 | Gudmundson | .............. | 114/344 |
| 3,385,458 A * | 5/1968 | Gresham | ..................... | 414/283 |
| 3,478,711 A * | 11/1969 | Combs | ........................ | 114/321 |
| 3,528,095 A * | 9/1970 | Gudmundson | ........... | 280/414.1 |
| 3,880,335 A * | 4/1975 | Winkler | .................... | 224/42.13 |
| 3,993,324 A * | 11/1976 | Carrick | .................... | 280/414.1 |
| 4,243,243 A * | 1/1981 | Edmisten | .................. | 280/455.1 |
| 4,395,185 A * | 7/1983 | Whaley | ....................... | 414/483 |
| 4,623,161 A * | 11/1986 | Sprague | ................... | 280/414.1 |
| 4,781,392 A * | 11/1988 | Cooper | ..................... | 280/414.1 |
| 4,895,387 A * | 1/1990 | Hawkins et al. | ........... | 280/414.1 |
| 5,131,342 A * | 7/1992 | Sackett | .......................... | 114/48 |
| 5,158,315 A * | 10/1992 | Godbersen | ............... | 280/414.1 |
| 5,429,383 A * | 7/1995 | Reed | ........................ | 280/414.1 |
| 5,967,539 A * | 10/1999 | Digman | .................... | 280/480.1 |
| 6,109,639 A * | 8/2000 | Blassingame et al. | .... | 280/414.1 |
| 6,409,194 B1 * | 6/2002 | Voas | ........................... | 280/204 |
| 6,851,382 B2 * | 2/2005 | Carter | ......................... | 114/344 |

(Continued)

*Primary Examiner*—Lesley Morris
*Assistant Examiner*—Wesley Potter
(74) *Attorney, Agent, or Firm*—Zarian Midgley & Johnson PLLC (57) ABSTRACT

A boat trailer that includes a first front sidewall and a second front sidewall connected to a frame. The front sidewalls include at least one compartment to store equipment, tools, gear, or other items. The front sidewalls may be comprised of fiberglass and may include at least one toe socket. The boat trailer may include a rear sidewalls connected to the frame. The first front sidewall and the second front sidewall may be substantially contoured to the hull of a boat. An adapter sidewall may be attachable to the front sidewalls so that the front sidewalls are substantially contoured to the hull of a second boat. The boat trailer may include a nose cone with a recessed step connected to each front sidewall. The boat trailer may include means to selectively connect the boat trailer to the motorized vehicle in addition to a typical tongue and hitch.

20 Claims, 7 Drawing Sheets

U.S. PATENT DOCUMENTS 7,125,032 B2 * 10/2006 Hopper .................... 280/414.1
7,273,019 B2 * 9/2007 Towley et al. ............... 114/344
2006/0278153 A1 * 12/2006 Towley et al. ............... 114/264

* cited by examiner

BOAT TRAILER WITH STORAGE COMPARTMENTS

CROSS-REFERENCE TO RELATED APPLICATIONS

This application is a continuation-in-part of application Ser. No. 29/241,731, filed Oct. 31, 2005, entitled "BOAT TRAILER" which is incorporated herein in its entirety by reference.

BACKGROUND OF THE INVENTION

1. Field of the Invention

The present invention generally relates to a boat trailer having a frame that includes a first front sidewall connected to one side of the frame and a second front sidewall connected to the other side of the frame. At least one of the front sidewalls includes at least one compartment that may be used to store boating equipment, tools, fishing gear, or other items as would be appreciated by one of ordinary skill in the art having the benefit of this disclosure. The front sidewall may be comprised of fiberglass and may include at least one toe socket formed into the front sidewall. The toe socket may aid in the entrance into a boat while the boat is located on the boat trailer. The boat trailer may include a first rear sidewall connected to the frame behind the first front sidewall and a second rear sidewall connected to the frame behind second front sidewall. The first front sidewall and the second front sidewall may be substantially contoured to the hull of a boat. A first adapter sidewall may be attachable to the first front sidewall to substantially contour the first front sidewall to the hull of a second boat. Likewise, a second adapter sidewall may be attachable to the second front sidewall to substantially contour the second front sidewall to the hull of the second boat. The sidewalls and adapter sidewalls may be comprised of fiberglass.

The boat trailer may include a first nose cone connected to the leading edge of the first front sidewall and a second nose cone connected to the leading edge of the second front sidewall. Each of the nose cones may be comprised of fiberglass and may include a recessed step to aid in the entrance of a boat while on the boat trailer. The boat trailer includes a tongue and hitch to connect to a motorized vehicle. The boat trailer may include additional means to selectively connect the boat trailer to the motorized vehicle to provide additional rigidity while loading or unloading a boat. The boat trailer may also include improved means for connecting bunk boards to the frame.

2. Description of the Related Art

Boating has become a popular activity and as such there is an increasing number of different sizes and shapes of boats. As a result, there are a large number of boat trailers commercially available for the transportation of boats. The majority of past boat trailers include a frame connected to at least one axle with a plurality of cross members. A plurality of bunk boards are connected across the frame cross members. The bunk boards are typically fastened to the trailer frame at predetermined locations to support the hull of a boat that will be transported on the trailer. In order to adapt to the varying sizes and shapes of the available boats, the bunk boards are often able to be repositioned along the cross members trailer frame. The repeated moving of the bunk boards can loosen the fasteners used to connect bunk boards to the frame. One example of typical fasteners used to connect bunk boards to the frame are u-bolts with nuts and lock washers. Typical u-bolt connectors, however, may become loose over time due to repeated use of the trailer. Further, the repositioning of the u-bolts may cause them to become loose allowing the connector and the bunk boards to unexpectedly move along the frame. It would thus be desirable to provide a connector that allows for the repositioning of bunk boards and that also remains fastened over time preventing the unwanted movement of bunk boards along the frame.

Boating activities often include a large amount of equipment such as fishing gear, water skiing equipment, or even apparatus used to help secure the boat to the trailer. Typical trailers are comprised of a frame assembly and do not provide any place to store any of this type of equipment. Instead, equipment must often be in the towing vehicle or even in the boat itself making it inconvenient, if not difficult, to access the equipment while the boat is located on the trailer. It would thus be beneficial to provide a boat trailer that includes a compartment that may be used to store equipment, gear, and/or tools. One of ordinary skill in the art would recognize that equipment, gear, and/or tools is for illustrative purposes only and that it may be beneficial to store a various number of items in a compartment of a boat trailer.

Some of the equipment used in boating activities may actually need to be stored inside of at due to the size of the equipment. If it is necessary to obtain this equipment, a person may need to climb on the trailer and into the boat. The majority of boat trailers are not equipped to aid in the entrance of a boat positioned on the trailer. It would thus be beneficial for a trailer that aids in the entrance of a boat while it is positioned on the trailer.

As discussed above, there are an increasing number of boats having different shapes and different sizes. As such, boat trailers often have a shape that generally corresponds to the hull of a boat and bunk boards are placed to correspond to the shape of the boat to be transported on the trailer. It may aid in the transportation of the boat if the general shape of the trailer substantially corresponds to the contour of the boat hull as it may provide better support to the boat as well as affect the aerodynamics of the trailer and boat while being towed. It may also be beneficial if the general shape of the trailer could also be substantially contoured to a hull of a second boat.

The popularity of boating has increased the cost as well as sophistication of boats. In to protect against theft, a boat may be protected by an alarm that is powered by a battery on the boat. The electronics on a boat may also be powered by the battery. While the boat may have an alarm it may be beneficial to also provide an alarm on the boat trailer. Thus, it may be beneficial to provide a battery platform to support a battery that may be used to power various electronics on the boat trailer such as an alarm. It may also be beneficial to house the battery within a sidewall attached to the frame and provide means to lower the battery platform so that the battery may be accessible. The battery may be a sealed battery that is waterproof. Alternatively, the battery may be housed inside a sealed plastic compartment.

In light of the foregoing, it would be desirable to provide a boat trailer that includes at least one storage compartment. It would further be desirable to provide a boat trailer that includes a fastener that may be used to connect bunk boards to the frame, wherein the fastener may be adjustable, but will not become loose due to forces exerted on the trailer as it is used over time. It would also be to provide a boat trailer that provides a toe socket and/or a recessed step to aid in the entrance into a boat positioned on the boat trailer.

The present invention is directed to overcoming, or at least reducing the effects of, one or more of the issues set forth above.

SUMMARY OF THE INVENTION

The object of the present disclosure is to provide a boat trailer having at least one storage compartment. In one embodiment the boat trailer includes a frame having a first longitudinal member, a second longitudinal member, a plurality of cross members connected between the first longitudinal member and the second longitudinal member, a first axle rotatably connected to the frame and two wheels connected to the first axle. The boat trailer further includes a first sidewall connected to the first longitudinal member, a second sidewall connected to the second longitudinal member, and at least one compartment in the first sidewall.

The boat trailer may include at least one compartment in the second sidewall. The boat trailer may also include a second axle rotatably connected to the frame and two wheels connected to the second axle. The boat trailer may also include a plurality of bunk boards connected to the plurality of cross members, at least one bunk board connected to the first sidewall, and at least one bunk board connected to the second sidewall.

In one embodiment a boat trailer is disclosed, the boat trailer including a frame having a front end, a rear end, a first longitudinal member, a second longitudinal member, and a plurality of cross members connected between the first longitudinal member and the second longitudinal member. The boat trailer includes a tongue, a first end of the tongue being connected to the front end of the frame and a hitch being connected to the second end of the tongue. The tongue may be rotatably connected to the frame. The trailer also includes at least one axle rotatably connected to the frame and at least two wheels connected to the axle.

The trailer also includes a first front sidewall connected to the first longitudinal member and a second front sidewall connected to the second longitudinal member. The first front sidewall and the second front sidewall both being adjacent to the front end of the frame. The trailer includes a first rear sidewall connected to the first longitudinal member and a second rear sidewall connected to the second longitudinal member. The first rear sidewall and the second rear sidewall both being adjacent to the rear end of the frame. The first front sidewall includes at least one compartment. The second front sidewall may also include at least one compartment. The front sidewalls of the boat trailer may be substantially contoured to the hull of a boat. The boat trailer may also include adapter sidewalls that may be connected to the front sidewalls to substantially contour the front sidewalls to the hull of a different boat.

The boat trailer may also include a plurality of bunk boards connected transversely to the cross member. A metal plate may be connected to each bunk board to weight the bunk boards. The bunk boards may also be covered in carpet or be encapsulated within a thermoplastic polymer. A non-slip assembly may be used to connect the bunk boards to the trailer frame. The non-slip assembly including a pivot bracket, a threaded rod, a threaded coupler, a u-bolt, and a non-slip bracket to prevent the movement of the u-bolt along a cross member, wherein the threaded coupler is connected to the u-bolt, the threaded coupler being threaded onto the threaded rod, the bracket being hingedly connected to the threaded rod, and the bracket being connected to the bunk board.

The boat trailer may include a pan in communication with the compartment of the first front sidewall and a pump positioned within the pan. The pump may be used to pump out water that has accumulated within the compartment. The boat trailer may include a float switch used to activate the pump.

The boat trailer may include a nose cap connected to each of the front sidewalls. The nose caps may be fiberglass and may each include at least one recessed step. The boat trailer may also include at least one toe socket in the first front sidewall and at least one toe socket in the second front sidewall. The boat trailer may include a retractable strap that may be used to secure the trailer to the bumper of a vehicle. The boat trailer may also include a battery platform hingedly connected to the frame that may be lowered to allow access to the battery.

One embodiment is for a boat trailer having a frame with a first longitudinal member, a second longitudinal member, and a plurality of cross members connected between the first longitudinal member and the second longitudinal member. The boat trailer includes a tongue connected to the frame that is adapted to selectively connect to a vehicle, a first axle rotatably connected to the frame, and two wheels connected to the first axle. The boat trailer further includes a first means for storing connected to the first longitudinal member and a second means for storing connected to the second longitudinal member. The means for storing may include any structure that is adapted to include an area that may be used to store an item as would be appreciated by one of ordinary skill in the art having the benefit of this disclosure.

The boat trailer may also include means for securing the trailer to the vehicle. The means for securing the trailer to the vehicle is in addition to the tongue and may be a retractable strap. However, additional means such as a chain, wire, rope, cord, or similar device could be used to secure the trailer to the vehicle as would be appreciated by one of ordinary skill in the art having the benefit of this disclosure. The means for storing may be substantially contoured to a hull of a first boat. The boat trailer may further include means for adapting the first means for storing to be substantially contoured to a hull of a second boat. The boat trailer may also include means for removing water out of the first means for storing. The means for removing water may include various devices such as pumps, valves, and ports that would allow for the removal of water from the storing means as would be appreciated by one of ordinary skill in the art having the benefit of this disclosure.

One embodiment is a fastener for securely connecting a bunk board to a boat frame, the fastener including a u-bolt, a non-slip bracket a threaded coupler, a threaded rod, and a pivot bracket. The u-bolt is adapted to secure to a cross member of a boat frame and is connected to the threaded coupler. The non-slip bracket is used to secure the u-bolt to the cross member of the boat frame and prevent movement of the u-bolt along the cross member. The non-slip bracket may include means, such as a tab, that prevents the movement of the u-bolt. The threaded coupled is positioned on the threaded rod, which is hingedly connected to the pivot bracket. The pivot bracket may be connected to a bunk board and may allow the bunk board to pivot about the threaded rod. The threaded coupler may be rotated about the threaded rod to adjust the height of the pivot bracket.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF ILLUSTRATIVE EMBODIMENTS

Illustrative embodiments of the invention are described below as they might be employed in a boat trailer having a first sidewall, a second sidewall, and at least one compartment in the first sidewall. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments of the invention will become apparent from consideration of the following description and drawings.

Figure 1:
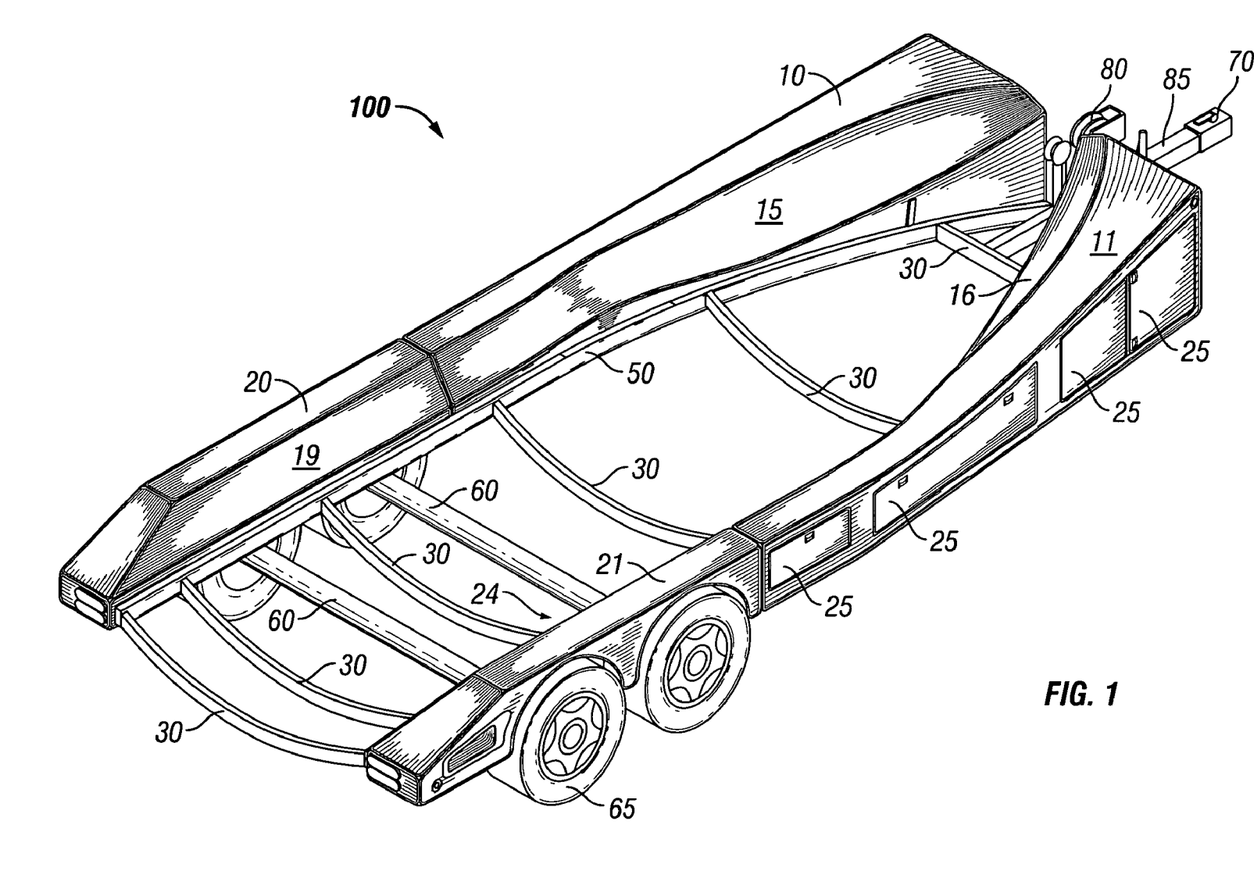
FIG. 1 shows one embodiment of a boat trailer that has sidewalls that are substantially contoured to the hull of a boat and include a plurality of compartments.

FIG. 1 shows a perspective view of one embodiment of a boat trailer 100. The boat trailer 100 includes a first longitudinal member 50, a second longitudinal member 51 (Shown in FIGS. 10 and 11), and a plurality of cross members 30 that are connected between the first longitudinal member 50 and the second longitudinal member 51. The location and number of cross members 30 is for illustrative purposes only and may be varied as would be appreciated by one of ordinary skill in the art. The boat trailer 100 also includes two axles 60 and wheels 65 attached to the axles. The number and location of the axles and the wheels of the boat trailer may be varied as would be appreciated by one of ordinary skill in the art having the benefit of this disclosure.

The boat trailer 100 also includes a tongue 85 and hitch 70 used to connect the boat trailer 100 to a vehicle (not shown). The boat trailer 100 includes a crank 80 that may be used to help pull a boat onto the boat trailer 100. The boat trailer has a first front sidewall 11, a second front sidewall 10, a first rear sidewall 21, and a second rear sidewall 20. Each of the sidewalls is preferably constructed out of fiberglass, but may be made out of other materials as would be appreciated by one of ordinary skill in the art having the benefit of this disclosure.

The sidewalls are connected to the longitudinal members 50, 51 of the boat trailer 100. The first front sidewall 11 includes a plurality of compartments 25. The compartments 25 may be used to store various items, such as fishing gear, boating equipment, or tools, for example. The number, size, and location of compartments 25 are for illustrative purposes only. The actual number, size, configuration, and location of a compartment may be varied within the spirit of the invention as would be recognized by one of ordinary skill in the art. The second front sidewall 10 may also include a plurality of compartments 25. The front sidewalls 10, 11 may include a surface 15, 16 that is substantially contoured to the hull of a boat. The contoured surfaces may provide better support to a boat, may improve the aerodynamics of the trailer, and may be more aesthetically pleasing. The rear sidewalls 20, 21 may also include a surface 19, 24 that may be substantially contoured to the hull of a boat. Alternatively, the boat trailer 100 may include a single sidewall with at least one compartment connected to one side of the frame with an additional sidewall connected to the other side of the frame.

Figure 2:
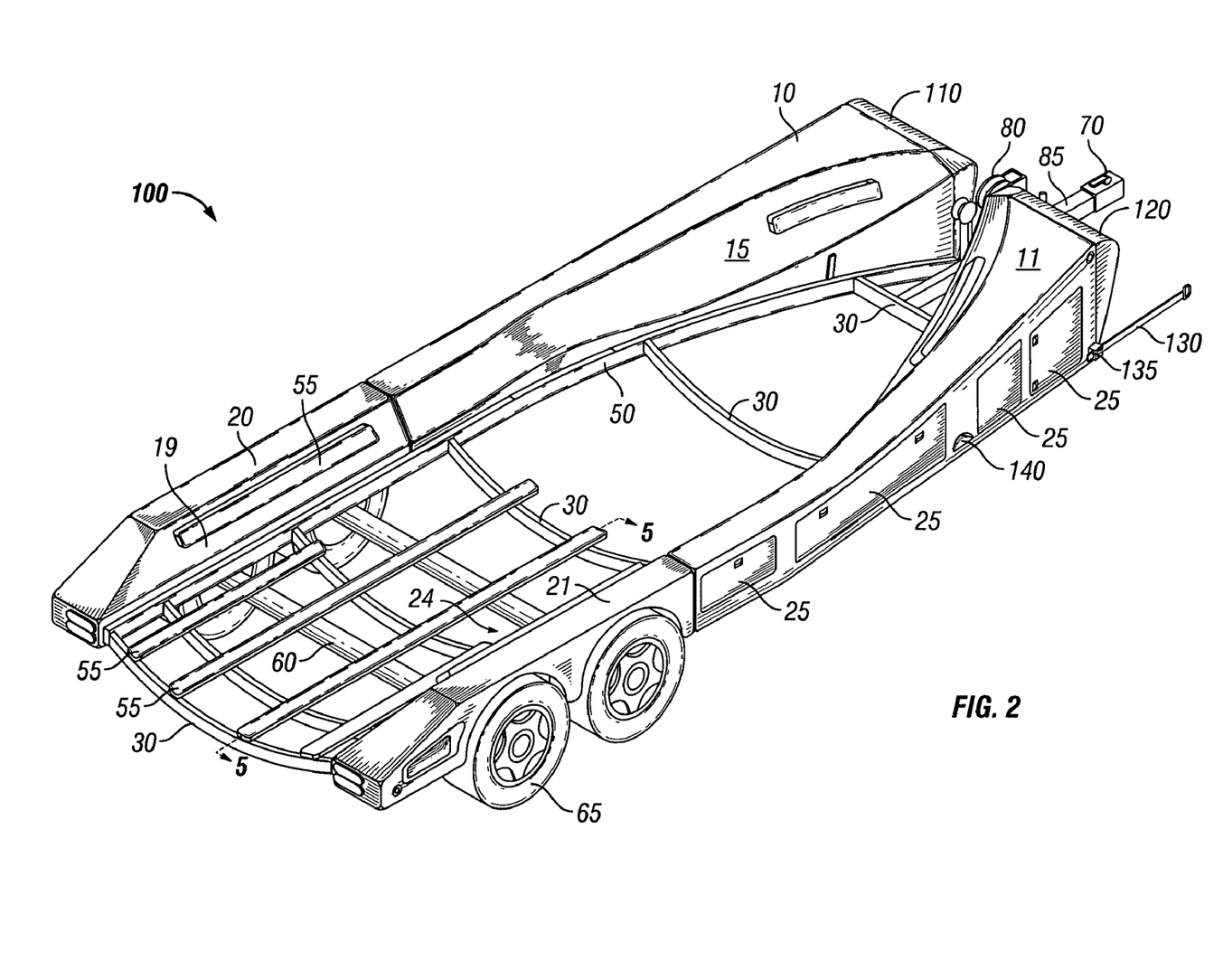
FIG. 2 shows one embodiment of a boat trailer that has sidewalls that are substantially contoured to a hull of a first boat, have a plurality of compartments, includes a toe socket, and has a retractable device for attaching the trailer to a vehicle in addition to the tongue and hitch.
Figure 6:
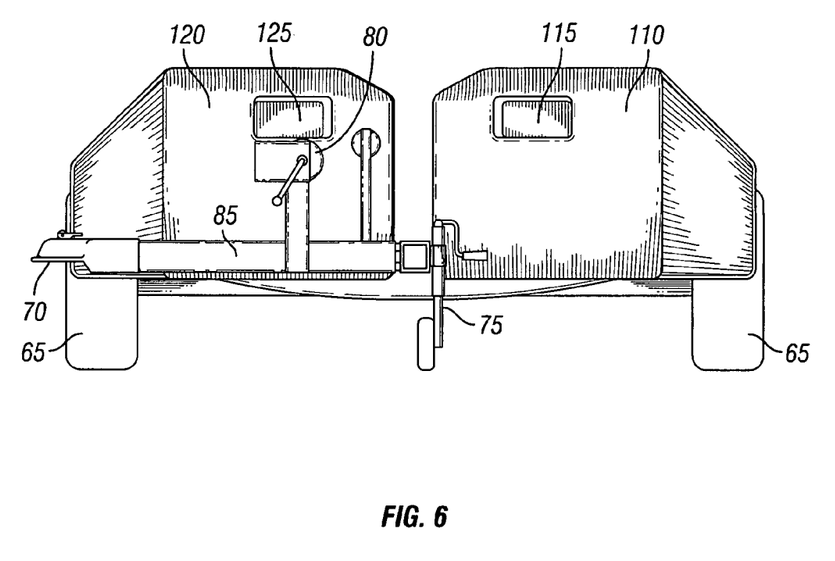
FIG. 6 is a front view of the boat trailer shown in FIG. 2.

FIG. 2 shows a perspective view of one embodiment of a boat trailer 100 that includes a first nose cap 120 connected to the first front sidewall 11 and a second nose cap 110 that is connected to the second front sidewall 10. The nose caps 110, 120 may be comprised of fiberglass and may help to protect the sidewalls 10, 11 and compartments 25 from being damaged by debris while the trailer is being towed. The nose cones 110, 120 may also conceal electronics, such as an alarm, that may be connected to the boat trailer 100. The nose cones 110, 120 may also include a recessed step 115, 125 as shown in FIG. 6. The recessed steps 115, 125 may provide easier access to the front of a boat while it is on the boat trailer 100. The boat trailer 100 may include a wheel 75 used to support the boat trailer 100 when the boat trailer 100 is not connected to a towing vehicle. The front sidewalls may includes a toe socket 140 that may be used to aid in the entrance of a boat on the boat trailer 100. The size, number, and location of the toe socket is for illustrative purposes only and may be varied as would be appreciated by one of ordinary skill in the art having the benefit of this disclosure.

Bunk boards 55 are connected to the cross members 30 of the boat trailer 100. The bunk boards 55 are positioned at designation locations on the boat trailer 100 to provide adequate support to the boat. Bunk boards 55 may also be attached to the front sidewalls 10, 11 and/or the rear sidewalls 20, 21. The bunk boards 55 may be positioned on the surfaces of the sidewalls that are substantially contoured to the hull of a boat. The boat trailer 100 includes a strap 130 that may extend out of a housing 135 connected to a front sidewall. The strap 130 may be connected to a portion of a towing vehicle to provide more rigidity to the trailer while loading or unloading a boat. The strap 130 may be retractable into the housing 135 and the boat trailer 100 includes a strap 130 and housing 135 on each of the front sidewalls 10, 11. The increased surface area of the sidewalls 110, 111 in comparison to typical boat trailers may subject the trailer to additional forces when positioned in turbulent or rough water. The straps 130 may help to prevent or minimize movement of the boat trailer 100 due to the turbulent water. The use of a strap 130 is for illustrative purposes and various other devices such as ropes, chains, cords, wires or similar devices may be used connect the boat trailer 100 to a portion of a towing vehicle.

Figure 3:
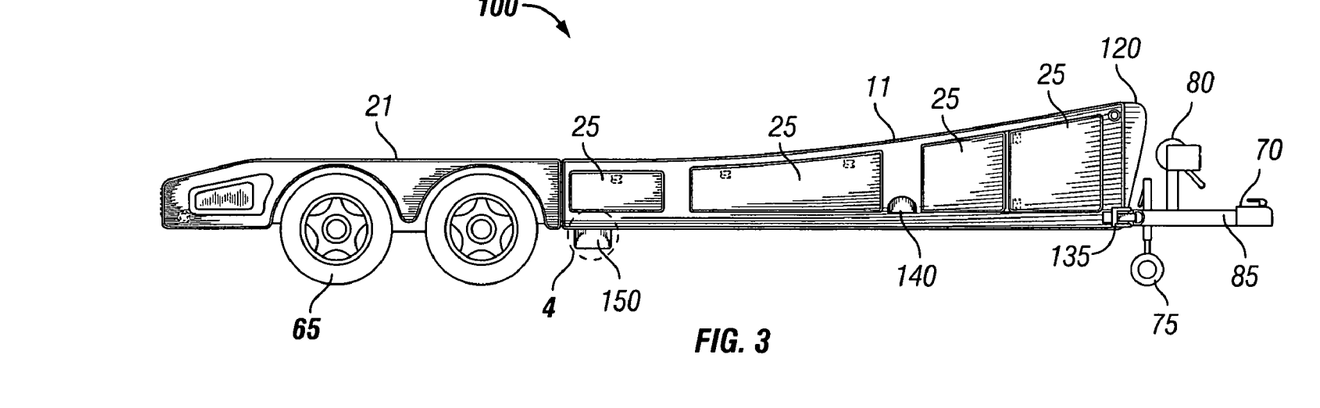
FIG. 3 is the side view of the boat trailer of FIG. 2 in shows a sump pan that may be connected to the compartment in the sidewalls.
Figure 4:
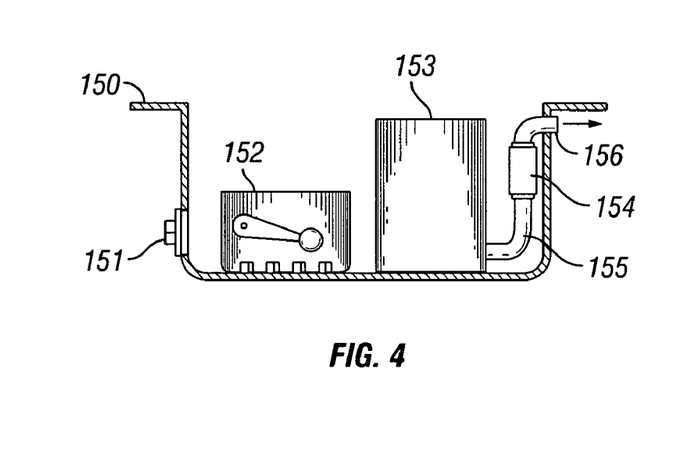
FIG. 4 shows a cross-section of the sump pan, which contains a float switch, a pump, a check valve, and a drain plug.

FIG. 3 is a side view of one embodiment of a boat trailer 100 that includes a wheel 75 that may be used to support the boat trailer 100 and a sump pan 150 that is in communication with a compartment 25. The sump pan 150 may collect water that has accumulated inside of the compartment 25. A pump 153 (shown in FIG. 4) may be used to remove the water from the compartment 25 and the sump pan 150. The sump pan 150 may also include a plug 151 that may be removed to drain water from the sump pan 150 and the compartment 25. A float switch 152 may be used to detect water accumulated in the sump pan 150 and activate the pump 153 to remove the water. The pump 153 may pump water through tubing 155 and out a port 156 that is connected to a check valve 154. The check valve 154 prevents the flow of water into the pump 153 and sump pan 150. The use of one sump pan 150 and configuration of pump 153, float switch 152, tubing 155, and check valve 154 are shown in FIGS. 3 and 4 for illustrative purpose only. Each compartment 25 may include a sump pan 150 and means for removing fluid from the compartment 25 such as a plug, relief valve, port, or pump as would be appreciated by one of ordinary skill in the art having the benefit of this disclosure.

FIG. 6 shows a front view of one embodiment of a boat trailer 100 that includes a first nose cone 120 and a second nose cone 110 connected to the front of the boat trailer 100. The nose cones 110, 120 include recessed steps 115, 125 that may be used to access the front of a boat on the boat trailer 100. The nose cones 110, 120 may be used to conceal and protect electronics, such as an alarm, connected to the boat trailer 100. The nose cones 110, 120 may also protect the front sidewalls and compartments of the trailer from being damaged by debris while the boat trailer 100 is being towed. The nose cones 110, 120 may be used to round the front of the trailer making it more aerodynamic as well as aesthetically pleasing. The tongue 70 of the boat trailer 100 may be rotatably connected to the frame of the boat trailer 100 allowing the tongue to be rotated to the side when the boat trailer 100 is not connected to a vehicle as shown in FIG. 6.

Figure 5:
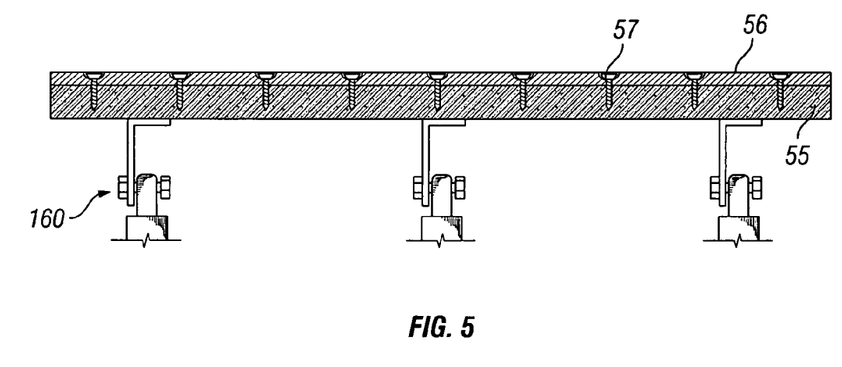
FIG. 5 illustrates a weighted bunk board and the assembly that may be used to fasten a bunk board to a cross member of the boat trailer frame.
Figure 7A:
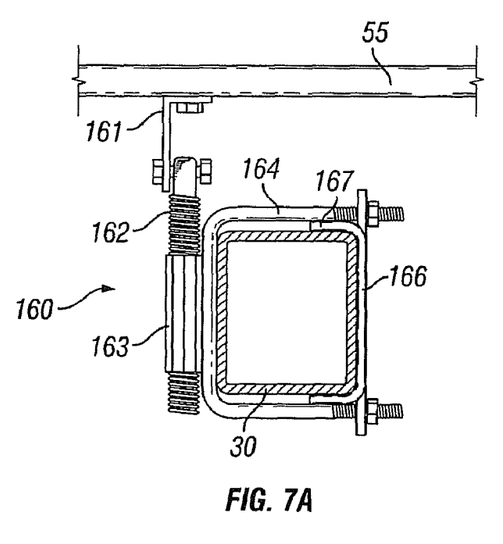
FIG. 7A shows a front view of the assembly that may be used to fasten a bunk board to a cross member of the boat trailer frame.
Figure 7B:
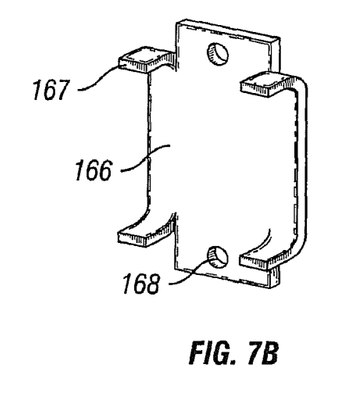
FIG. 7B shows a perspective view of a non-slip bracket that may be used to secure a u-bolt to a cross member and also prevent movement of the u-bolt along the cross member.
Figure 8:
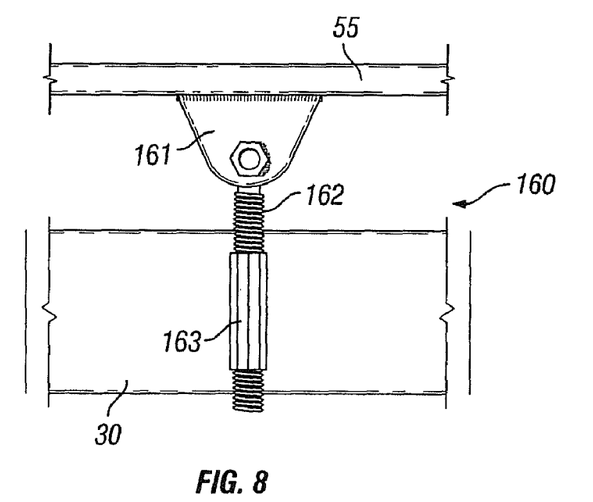
FIG. 8 shows the side view of the assembly shown in FIG. 7A.

FIG. 5 shows a bunk board 55 that has been weighted with a metal bar 56. The metal bar 56 may be connected to the bunk board 55 with fasteners 57 or various other means as would be recognized by one of ordinary skill in the art. A non-slip assembly 160 (shown in FIGS. 7A, 7B, and 8) may be used to connect the bunk board 55 to a cross member 30 of the boat trailer 100. The non-slip assembly 160 includes a u-bolt 164 that is adapted to fasten to a cross member 30. A non-slip bracket 166 may be used to secure the u-bolt 164 to the cross member 30. A shown in FIG. 7B, the non-slip bracket 166 may include means, such as a tab 167 or a plurality of tabs, that prevents the movement of the u-bolt 164 along the cross member 30. The non-slip bracket 166 may also include holes 168 so that the bracket 166 may be fastened to the u-bolt 164. A threaded coupler 163, which is connected to the u-bolt 164, is positioned onto a threaded rod 162. The threaded coupler 163 may be welded to the u-bolt 164 or may be connected to the u-bolt in various other manners that may provide an adequate connection. A pivot bracket 161 is connected to the top of the threaded rod 162. The pivot bracket 161 is also connected to a bunk board 55 and may allow the bunk board 55 to pivot about the connection point of the pivot bracket 161 to the threaded rod 162. The rotation of the threaded coupler 163 around the threaded rod 162 may be used to adjust the height of the bunk board 55. The threaded coupler 163 is securely fastened to the threaded rod 162 decreasing the chance that the non-slip assembly 160 may loosen over time due to repeated use of the boat trailer 100.

Figure 9:
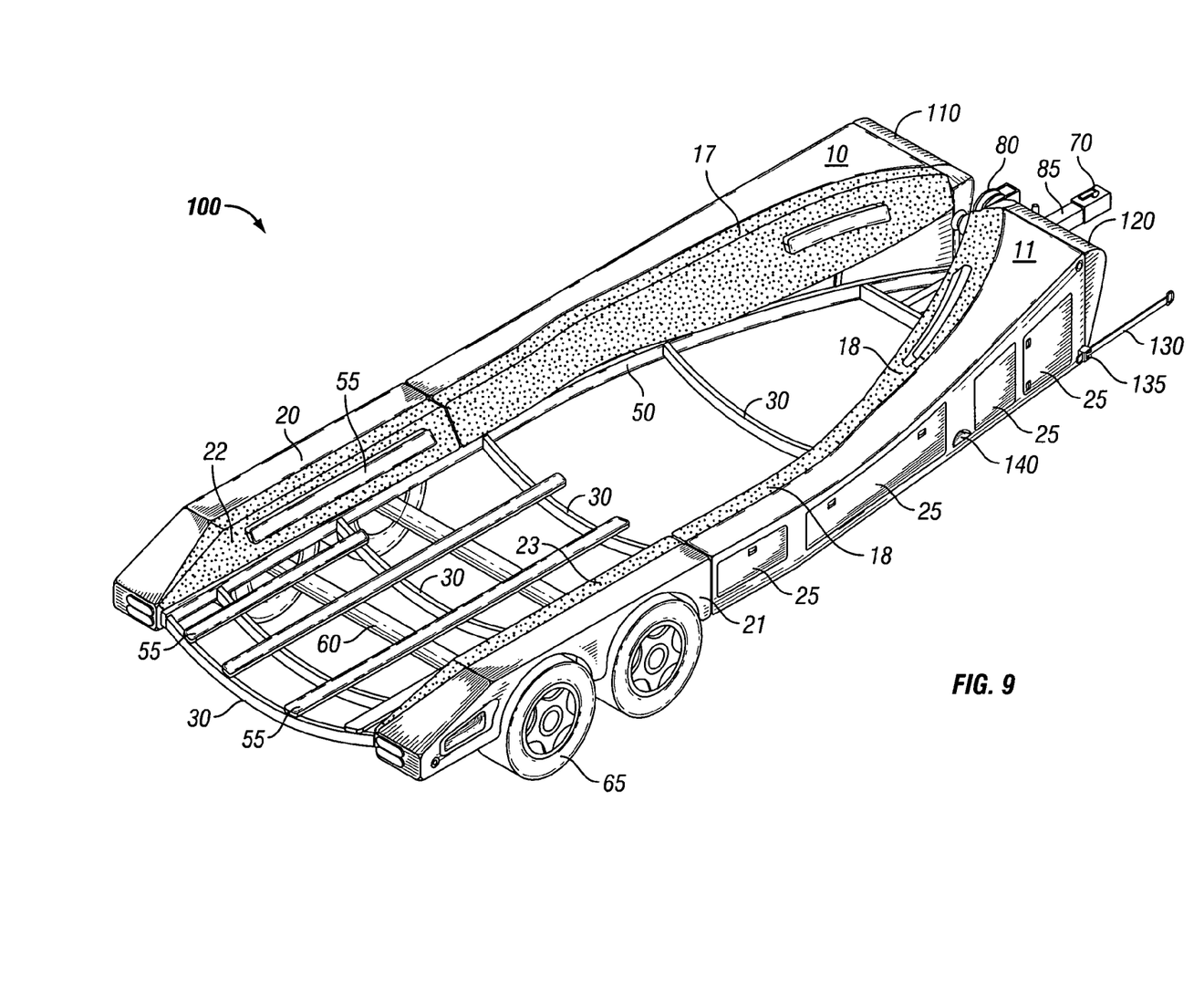
FIG. 9 shows one embodiment of a boat trailer that includes adapter sidewalls connected to the sidewalls of the boat trailer, the adapter sidewalls may be substantially contoured to the hull of a second boat.

FIG. 9 shows one embodiment of a boat trailer 100 that uses adapter sidewalls 17, 18 that may be attached to the front sidewalls 10, 11 of the boat trailer 100. The adapted sidewalls 17, 18 may be comprised of fiberglass and may be substantially contoured to the hull of a second boat. This use of adapter sidewalls 17, 18 permits the contour of the boat trailer 100 to be adapted such that the same boat trailer may be used with different boats. Rear adapter sidewalls 22, 23 may also be connected to the rear sidewalls 20, 21 to reconfigure the profile or contour of the rear portion of the boat trailer 100.

Figure 10:
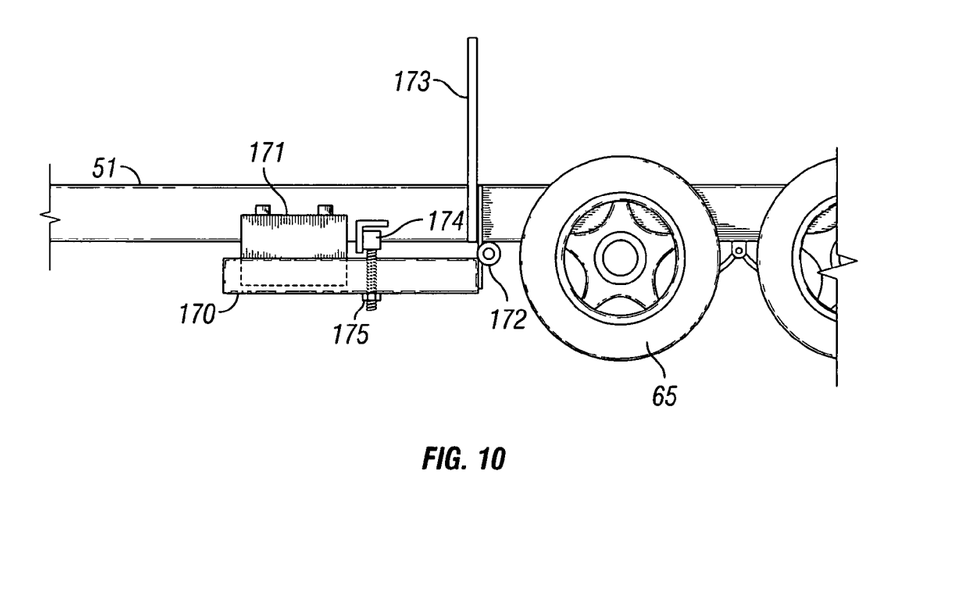
FIG. 10 shows one embodiment of a battery platform that is hingedly connected to the frame of the boat trailer.
Figure 11:
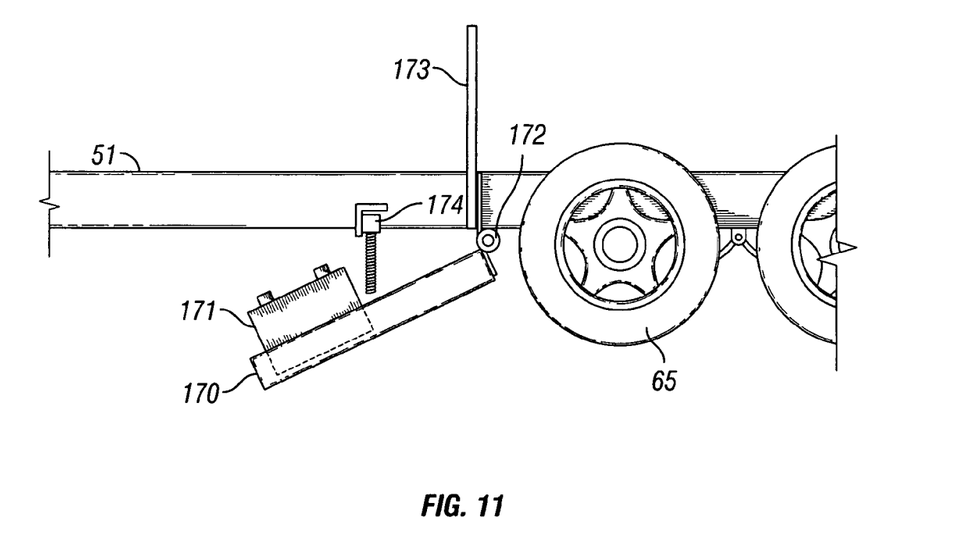
FIG. 11 shows the battery platform shown in FIG. 10 that is moved away from the frame of the boat trailer to allow easier access to the battery.

FIGS. 10 and 11 show a battery platform 170 that may be used to support a battery 171 within a rear sidewall of the boat trailer 100. The battery 171 may be used to power various electronics installed on the boat trailer 100, such as an alarm for example. The battery platform 170 may be selectively connected to the second longitudinal member 51 by a removable fastener 175 on a threaded rod 174. The removal of the fastener 175 allows the battery platform 170 to about hinge 172 that is connected to the frame of the boat trailer 100. The hinge 172 may be connected to a vertical member 173 used to support a rear sidewall of the boat trailer 100. The boat trailer may include a crank used to pivot or lower the battery platform 170 with respect to the longitudinal member 51.

Although various embodiments have been shown and described, the invention is not so limited and will be understood to include all such modifications and variations as would be apparent to one skilled in the art.

What is claimed is:
1. A boat trailer, the boat trailer comprising:
  a frame having a front end and a rear end, the frame including a first longitudinal member, a second longitudinal member, and a plurality of cross members connected between the first longitudinal member and the second longitudinal member;
  a tongue having a first end and a second end, the first end of the tongue being connected to the front end of the frame; a hitch connected to the second end of the tongue; at least one axle rotatably connected to the frame;
  at least two wheels connected to the at least one axle;
  a first front sidewall connected to the first longitudinal member, wherein the first front sidewall is adjacent to the front end of the frame;
  a second front sidewall connected to the second longitudinal member, wherein the second front sidewall is adjacent to the front end of the frame and wherein the first front sidewall and the second front sidewall are substantially contoured to a hull of a boat;
  a first rear sidewall connected to the first longitudinal member, wherein the first rear sidewall is adjacent to the rear end of the frame;
  a second rear sidewall connected to the second longitudinal member, wherein the second rear sidewall is adjacent to the rear end of the frame;
  wherein the first front sidewall includes at least one storage compartment configured to store a plurality of items;
  a pump located within the at least one storage compartment of the first front sidewall; and
  an adapter sidewall attachable to the first front sidewall, wherein the adapter sidewall is substantially contoured to a hull of a second boat.

2. The boat trailer of claim 1 wherein the second front sidewall includes at least one storage compartment.

3. The boat trailer of claim 1 wherein the plurality of items comprises at least one of:
fishing gear;
tools;
boating equipment; and
water skiing equipment.

4. The boat trailer of claim 1 wherein the tongue is rotatably connected to the frame.

5. The boat trailer of claim 1 further comprising a plurality of bunk boards connected to the plurality of cross member, wherein the bunk boards are substantially transverse to the plurality of cross members.

6. The boat trailer of claim 5 wherein a metal plate is connected to each of the bunk boards.

7. The boat trailer of claim 5 wherein each of the bunk board is covered in carpet or is encapsulated with a thermoplastic polymer.

8. The boat trailer of claim 5 wherein each of the bunk boards is connected to a cross member by a non-slip assembly, the non-slip assembly including a pivot bracket, a threaded rod, a threaded coupler, a u-bolt, and a non-slip bracket to fasten the u-bolt to a cross member, wherein the threaded coupler is connected to the u-bolt, the threaded coupler being threaded onto the threaded rod, the bracket being hingedly connected to the threaded rod, and the bracket being connected to the bunk board.

9. The boat trailer of claim 1 wherein the pump is located within a pan in communication with the at least one storage compartment of the first front sidewall.

10. The boat trailer of claim 9 further comprising a float switch connected to the pump, wherein the float switch is used to activate the pump.

11. The boat trailer of claim 1 further comprising a first nose cap connected to the first front sidewall and a second nose cap connected to the second front sidewall.

12. The boat trailer of claim 11 wherein the first nose cap and the second nose cap are fiberglass and each includes at least one recessed step.

13. The boat trailer of claim 1 further comprising at least one toe socket in the first front sidewall.

14. The boat trailer of claim 1 further comprising a strap connected to the first front sidewall, wherein the strap may be attached to a bumper of a vehicle.

15. The boat trailer of claim 14 wherein the strap is retractable from the first front sidewall.

16. The boat trailer of claim 1 further comprising a battery platform hingedly connected to the frame, the battery platform being located inside the first rear sidewall.

17. The boat trailer of claim 16 wherein the battery platform may be hingedly lowered from the first rear sidewall.

18. The boat trailer of claim 1 wherein the at least one storage compartment comprises at least one door.

19. A boat trailer, the boat trailer comprising:
a frame, the frame including a first longitudinal member, a second longitudinal member, and a plurality of cross members connected between the first longitudinal member and the second longitudinal member; a tongue connected to the frame, wherein the tongue is adapted to selectively connect to a vehicle;
a first axle rotatably connected to the frame;
two wheels connected to the first axle;
a first means for storing connected to the first longitudinal member;
a second means for storing connected to the second longitudinal member, wherein the first means for storing is substantially contoured to a hull of a first boat and the second means for storing is substantially contoured to the hull of a first boat;
means for adapting the first means for storing to be substantially contoured to a hull of a second boat; and
means for removing water out of the first means for storing.

20. The boat trailer of claim 19 further comprising means for securing the trailer to the vehicle.

* * * * *